July 16, 1957 C. E. BECK 2,799,508

AUTOMATIC RECORD CHANGER

Filed April 25, 1950 5 Sheets-Sheet 1

INVENTOR.
Charles E. Beck,
BY
Norman L. Mueller
Atty.

July 16, 1957 C. E. BECK 2,799,508

AUTOMATIC RECORD CHANGER

Filed April 25, 1950 5 Sheets-Sheet 2

INVENTOR.
Charles E. Beck,
BY
Norman L. Mueller
Atty.

July 16, 1957 C. E. BECK 2,799,508

AUTOMATIC RECORD CHANGER

Filed April 25, 1950 5 Sheets-Sheet 3

INVENTOR.
Charles E. Beck,
BY
Forman L. Mueller
Atty.

INVENTOR.
Charles E. Beck,
BY
Foorman L. Mueller
Atty.

INVENTOR.
Charles E. Beck,
BY Forman L. Mueller
Atty.

United States Patent Office 2,799,508

Patented July 16, 1957

2,799,508

AUTOMATIC RECORD CHANGER

Charles E. Beck, Park Ridge, Ill., assignor to Motorola, Inc., Chicago, Ill., a corporation of Illinois Application April 25, 1950, Serial No. 157,952

2 Claims. (Cl. 274—10)

This invention relates generally to record playing means for a sound reproducing device and more particularly to automatic apparatus for playing a plurality of records in sequence.

It has become common practice to use automatic apparatus for changing and playing records on which music and other sounds have been recorded. Although records of various shapes have been used, this invention is directed to apparatus for changing records in the form of flat circular discs. Prior record changing apparatus for such records has been generally of two types, the single post type and the multiple post type. In the single post type, the records are supported on a center spindle and one post at the periphery of the records with the records being dropped by operation of the center spindle. These systems have been objectionable in that the portion of the record about the center hole becomes damaged by the record changing apparatus. Multiple post changers have not resulted in damage to the record in this respect but have been of relatively complicated and expensive construction. Record changers of both types have been objectionably noisy and slow in operation and have been of relatively complicated construction so that considerable maintenance is required in keeping them in proper operating condition. The complexity of the structure is increased because of the requirement that the changers handle records of a plurality of sizes.

It is therefore an object of the present invention to provide an improved automatic record changer for a sound reproducing machine.

It is another object of this invention to provide a record changer of simple construction which is arranged to handle records of a plurality of different sizes.

It is a further object of this invention to provide a record changing mechanism in which records are provided on a turntable in rapid succession and in which the records are not damaged by the record changing mechanism.

A feature of this invention is the provision of an automatic record changer including a reciprocating slide which controls all the operations required for changing and playing records, with the slide being driven by the turntable through a disengageable mechanical coupling.

A further feature of this invention is the provision of a record changer in which the operating mechanism is driven by the turntable through a link which is held inoperative while a record is being played and which is rendered operative when the tone arm reaches the end of the playing portion of a record.

A still further feature of this invention is the provision of an automatic record changer having a tone arm supported intermediate the ends thereof by a rotatable spindle and a slide positioned under the spindle having an inclined portion thereon for raising the tone arm and a friction portion for engaging a portion of the spindle for rotating the tone arm.

Another feature of this invention is the provision of a supporting post which cooperates with a center spindle for supporting records and which may be moved to a plurality of positions for supporting records of different size, with the post including push-off fingers operable in both positions and stops for limiting the movement of a tone arm so that the tone arm is properly positioned for records of the size being played.

Further objects and features will be apparent from a consideration of the following description taken in connection with the accompanying drawings in which.

In practicing the invention there is provided a simple record changer mechanism for automatically changing and playing records having different diameters. The changer includes a turntable for supporting the record being played, a spindle at the center of the turntable, a tone arm for engaging the top record on the turntable, and a supporting post for supporting the tone arm and also for supporting records above the turntable. The turntable is driven at the rim in a well known manner and the changing mechanism is coupled to the turntable through a disengageable link which normally is held inoperative and which is moved into operative position when the tone arm approaches the center of the record. A slide is provided under the turntable which is moved when the link engages the turntable in a single back and forth reciprocating movement. The slide engages the tone arm spindle for raising the tone arm and rotating the same as required in the changing cycle. The slide operates through a trip arm to move push-off fingers for moving one record to a position so that it drops on the turntable. The record support is adjustable to two positions for receiving ten and twelve inch records respectively and includes two push-off fingers which are individually operative in the two positions. The support post also includes a stop mechanism movable to different positions corresponding to the positions of the support shelf for limiting the position of the tone arm so that the arm is properly positioned on the edge of a record of either size.

Figure 1:
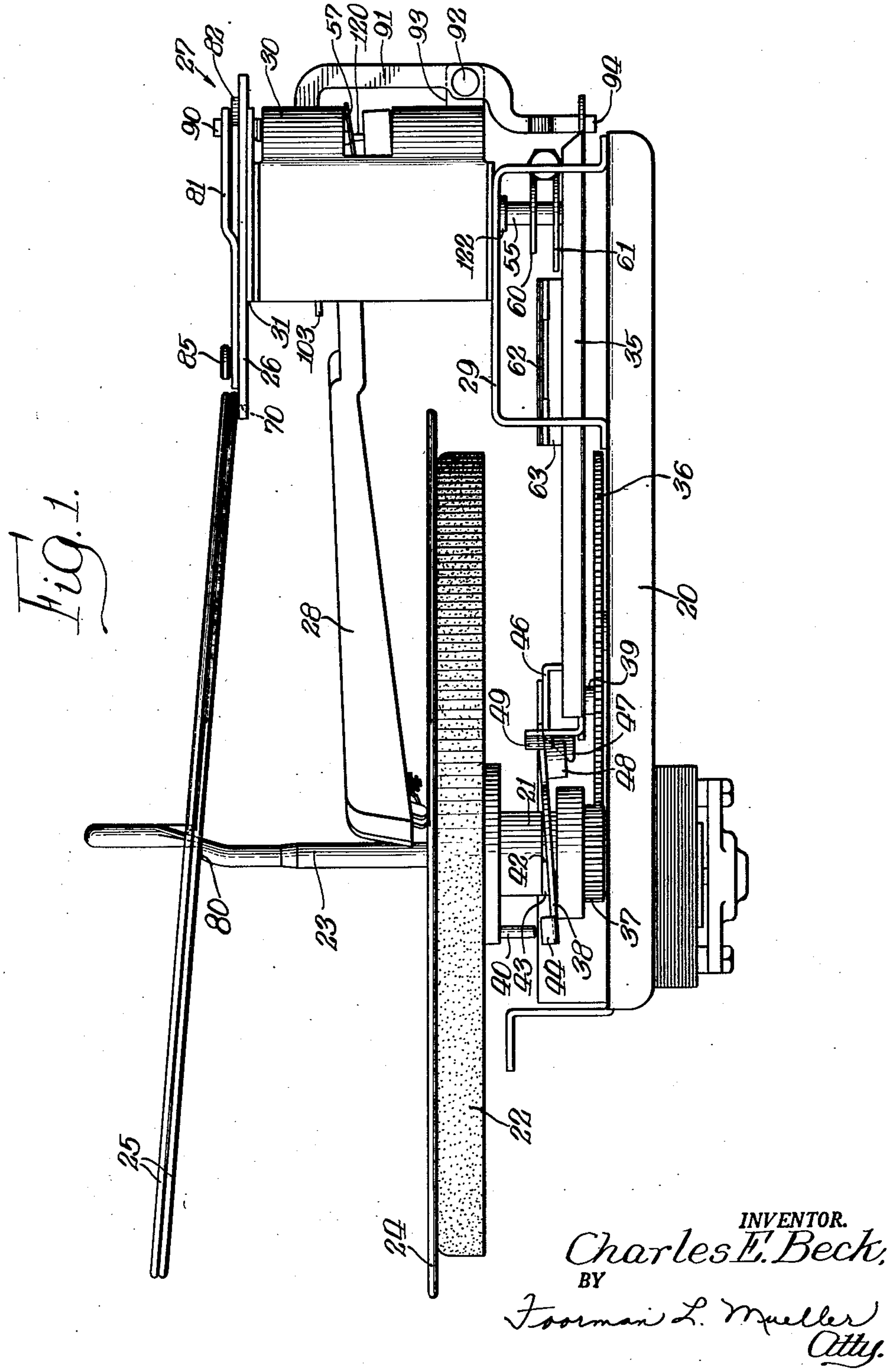
Fig. 1 is a side view of the record changing and playing mechanism.

Referring now to the drawings, in Fig. 1 the record changer is illustrated as including a main support frame 20 to which is secured a stud 21 on which the turntable 22 is rotatably supported. A spindle 23 is also supported in the stud 21 at the center of the turntable. A record 24 is shown in playing position on the turntable and additional records 25 are shown supported on the spindle 23 and the shelf 26 of the support post 27. The support post 27 also supports the tone arm 28, and includes a bottom frame member 29 secured to the main frame 20 and a top frame member 30 which supports the top plate 31 on which the record supporting shelf 26 is mounted.

Figure 2:
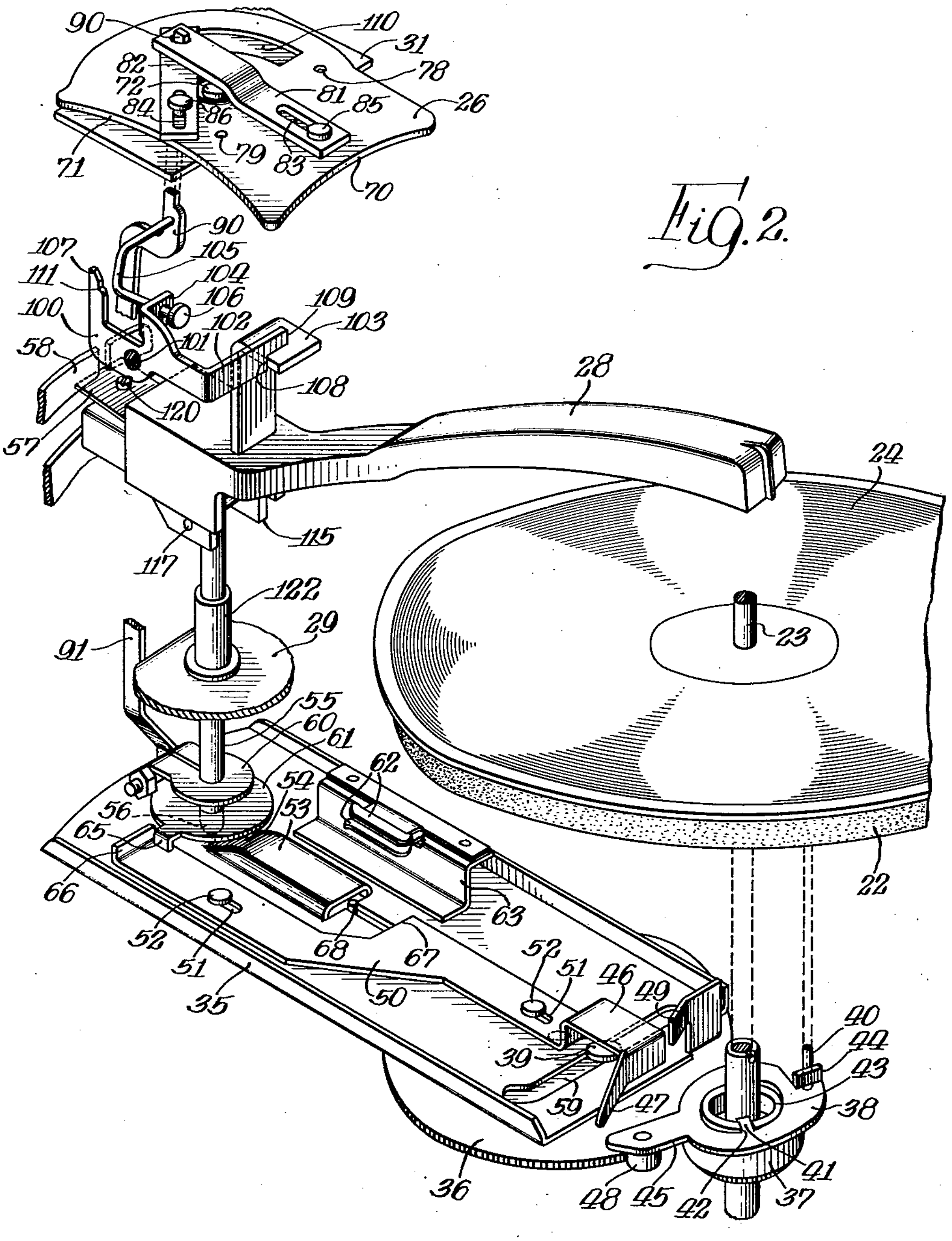
Fig. 2 is an exploded perspective view illustrating the mechanism of the record changer.

Slidably mounted in slots in the frame member 29 is a main slide member 35 which controls the entire operating mechanism of the record changer to provide all the required movements thereof. The slide member 35 is driven from the turntable 22 through gears 36 and 37 and the disengageable link or dog 38. The gear 36 has a pin 39 mounted therein which is positioned in slot 59 in the slide member 35 for causing reciprocal movement of the slide as the gear 36 rotates. The gear 37 drives the gear 36 and is driven through the dog 38 which engages pin 40 secured to the turntable. The dog 38 has inner projections 41 (Fig. 2) positioned in slots 42 in the rim 43 formed on the gear 37, so that the gear is forced to rotate with the dog. The dog has a projection 44 for engaging the pin 40 and a projection 45 oppositely positioned with respect to the projection 44 which cooperates with sliding shelf 46 supported on the slide 35 to render the link or dog 38 operative.

The shelf 46 controls the connection of the record changer mechanism through the dog 38 and has an inclined end 47 on which the projection 45 rides up to the shelf proper. As shown in Fig. 1 the shelf normally holds the projection 45 in a position so that the projection 44 is below the pin 40 and the dog 38 is therefore disengaged. As will be more fully explained, the shelf 46 is withdrawn from under the projection 45 and the weight 48 secured to the projection then causes the projection 45 to drop and the projection 44 to rise and engage the pin 40 on the turntable. In this position, the dog provides a connection between the turntable and the gear 37 so that the motion of the turntable is transmitted through gears 37 and 36 to the main slide 35 for causing the slide to reciprocate through one backward and forward movement. A stop 49 is formed on the slide 35 to prevent the projection 45 from being carried beyond the shelf 46. However, when the shelf 46 is withdrawn the projection 45 drops below the stop 49 so that the dog is free to rotate with the turntable. The shelf 46 has connected thereto an arm 50 having slots 51 therein which receives pins 52 secured to the slide 35. This permits the shelf 46 and arm 50 to move with respect to the slide 35.

The slide 35 has a raised portion 53 formed therein with an inclined end 54. The tone arm 28 is supported by a shaft or spindle 55 having an end 56 which rests on the main slide 35 and which rides up the incline 54 to the raised portion 53 as the slide moves back. The tone arm 28 is pivotally supported on the spindle 55 and has a rear extension 57 which engages a portion 58 of the upper frame 30 so that as the spindle 55 is raised the record engaging end of the tone arm is raised and to a greater extent than the spindle because of the leverage provided about the rear pivot.

Figures 3, 4:
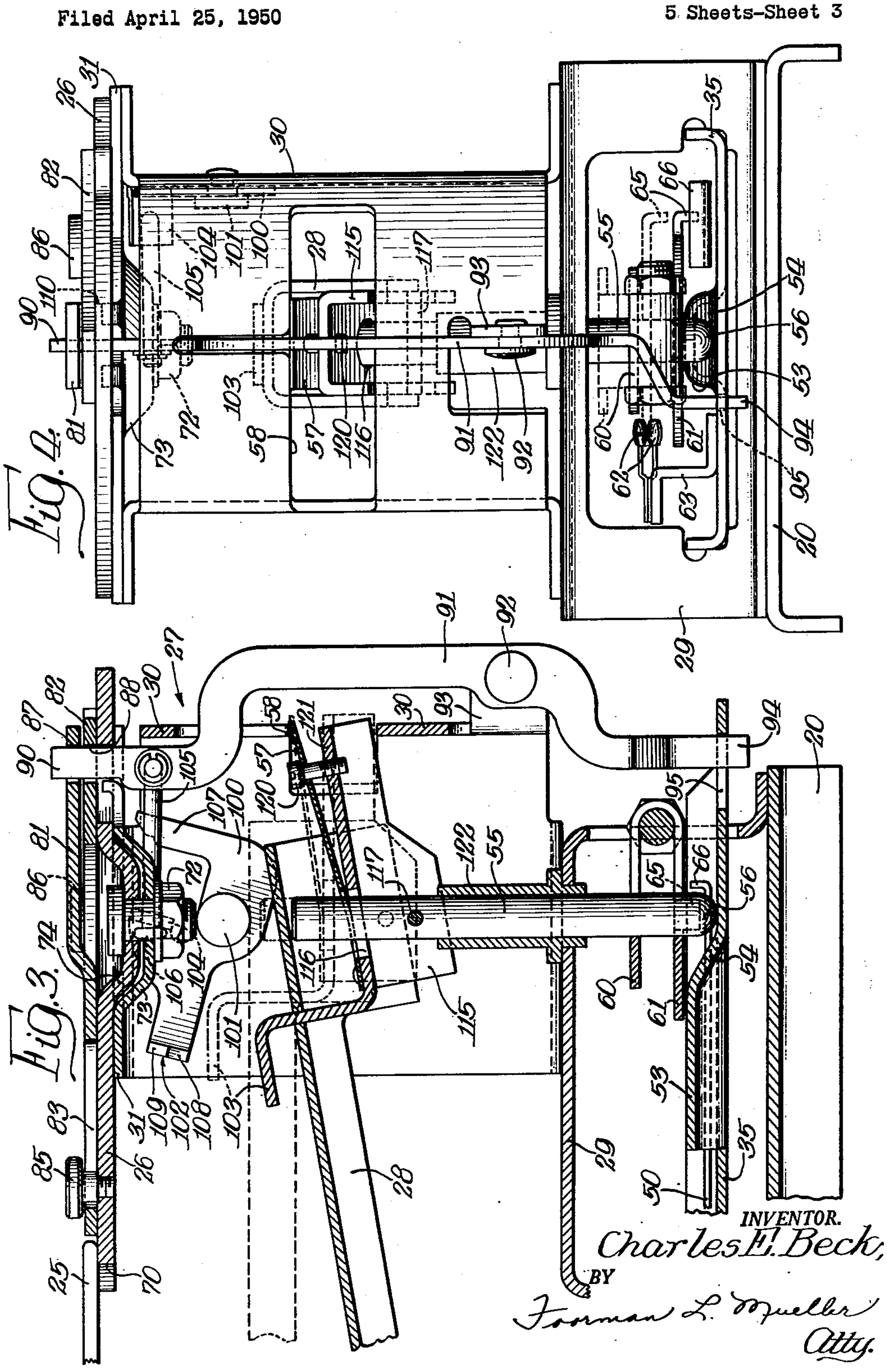
Fig. 3 is a cross section view through the spindle and record support.
Fig. 4 is a back view of the changer mechanism.

For supporting the tone arm 28 on the spindle 55, a U-shaped bracket 115 is provided, having an opening 116 therein through which the spindle extends (Fig. 3). A pin 117 extends through an opening in the spindle and through openings in the arms of U-shaped bracket 115 to provide a pivotal mounting therebetween. The bracket 115 may have formed integrally therewith a finger 103 which extends above the tone arm, the operation of which will be described more in detail. Supported on the bracket 115 is the extension 57 which engages the edge 58 of the upper frame member 30. This extension may be a spring member so that as it engages the edge 58 it will flex and the tone arm will not be abruptly moved. The position of the extension with respect to the bracket 115 may be controlled by a screw 120 threaded in a rear extension 121 of the bracket 115. The spindle 55 rotates in a bearing 122 which is secured to the lower frame member 29, with the spindle 55 being also slidable within the bearing 122 to permit the spindle to rise as the bottom end 56 thereof engages the incline 54 of the main slide 35.

Secured to the spindle 55 is a U-shaped clamp 60 having a bottom disc portion 61. The clamp is positioned on the spindle so that as the end of the spindle rides up on the raised portion 53, the disc 61 is positioned to be engaged by spring fingers 62 secured to a support 63 on the slide 35. These fingers engage the disc 61 to move the same and thereby rotate the tone arm 28. The operation of the fingers will first cause the tone arm to move away from the center of the record as the slide moves back, so that it is out of the way when the next record is dropped, and then as the slide 35 moves in, the tone arm will be rotated toward the record. The tone arm is limited in its movement toward the center of the record by an adjustable stop mechanism so that it is properly positioned for records of various sizes. This stop mechanism will be described in more detail hereinafter.

For causing operation of the changing mechanism, there is provided a projection 65 on the disc 61 which engages a projection 66 on the end of the arm 50. When the shelf 46 is in position to hold the dog 38 out of engagement with the tone arm (Fig. 1), it is in its foremost position. As the tone arm 28 approaches the center spindle 23, when the playing of a record has been completed, the projection 65 engages the projection 66 to pull the arm 50 back and withdraw the shelf 46 from under the projection 45. As previously stated, this causes engagement of the dog 38 with the pin 40 on the turntable and operates to drive the gears 36 and 37 to cause the slide 35 to move backward and then forward. As the slide 35 moves backward, the portion 67 on the arm 50 engages pin 68 which is supported on the main frame 20. This restrains the arm 50 with respect to the slide 35 so that the shelf 46 is moved nearer the front end of the slide 35 and is again in operative position. When the slide 35 has completed its backward and forward movement the projection 47 is positioned so that the projection 45 on the dog 38 rides up onto the shelf 46 and is disengaged from the turntable. The gears 36 and 37 may be of such diameter that the gear 36 makes one complete revolution to provide the complete changing cycle while the gear 37 and the turntable 22 make four complete revolutions.

Figures 5, 6, 7:
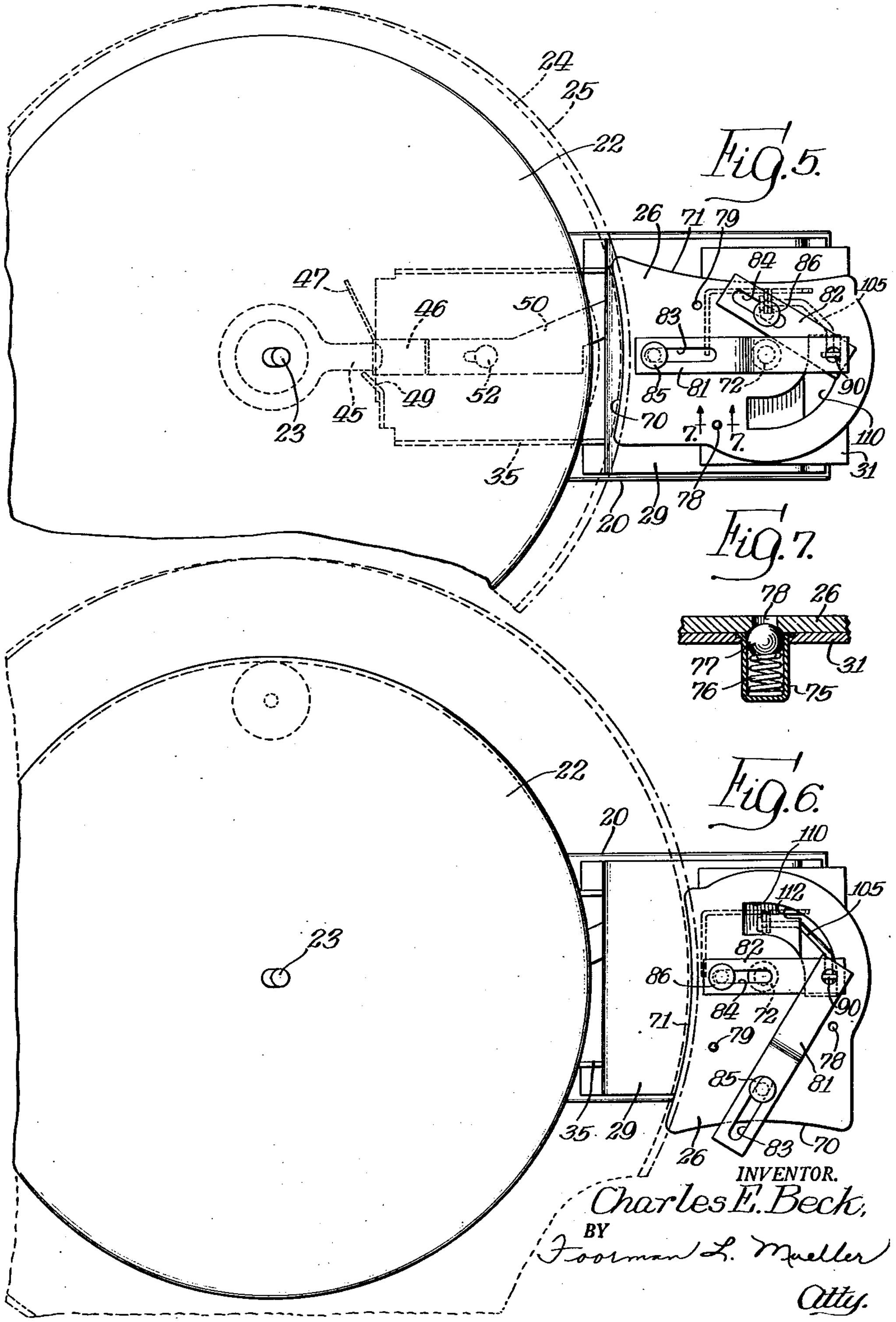
Fig. 5 is a top view with the support post adjusted for receiving small records.
Fig. 6 is a top view with the support post adjusted for receiving larger records.
Fig. 7 is a detailed cross section view along the lines 7—7 of Fig. 5.

Considering now the support post 27 and the means for supporting and ejecting records therefrom, reference is made to Figs. 3 to 12 inclusive. As shown in Figs. 5 and 6, the record supporting shelf 26 includes record engaging edge 70 for ten inch records and record engaging edge 71 for twelve inch records. The shelf is supported on plate 31 (Fig. 3) by bolt 72, with the plate 31 and the shelf 26 having inter-fitting cupped portions 73 and 74 respectively which position the shelf with respect to the plate. For indexing the shelf in the positions for supporting records of two sizes, a detent arrangement is provided as illustrated in Fig. 7. The detent includes a retainer 75 secured to the plate 31, which contains therein a spring 76 and a ball 77. The ball is urged against the shelf 26 which includes two openings 78 and 79 adapted to receive the ball therein. The opening 78 is positioned to receive the ball when the shelf is adjusted for supporting ten inch records and the opening 79 is positioned to receive the ball when the shelf is adjusted for supporting twelve inch records.

As shown in Fig. 1, the center spindle 23 has a shoulder 80 thereon which helps support the records above the turntable. Records are individually dropped by being moved to a position in which the center hole clears the projection 80. This is accomplished through the push-off fingers 81 and 82 supported on the shelf 26. These fingers include slots 83 and 84 respectively for receiving screws 85 and 86 threaded in the shelf 26. The fingers have openings 87 and 88 at the rear ends thereof in which is positioned the upper end 90 of a push-off arm 91. The arm 91 is supported by pivot 92 secured to projection 93 on the upper frame 30, and includes a lower end 94 positioned in a slot 95 in the rear end of the main slide 35. As the slide moves all the way back, the forward end of the slot 95 engages the end 94 of the push-off arm causing this end to be moved back and the end 90 thereof to be moved forward. The end 90 of the push-off fingers therefor causes movement of the push-off fingers 81 and 82 so that the one which is in operative position pushes the bottom record to a position in which the center hole thereof clears the shoulder 80 on the spindle 23 and the edge of the record clears the shelf 26 so that the record drops down onto the turntable. As clearly shown in Fig. 5 the push-off finger 81 in in operative position when the shelf is positioned for ten inch records and the finger 82 is out of the way so that it does not interfere with the operation. Similarly, as shown in Fig. 6, the finger 82 is in operative position when the shelf supports twelve inch records and the finger 81 is out of the way and does not interfere with the changing operation.

Figures 8, 9, 10, 11, 12:
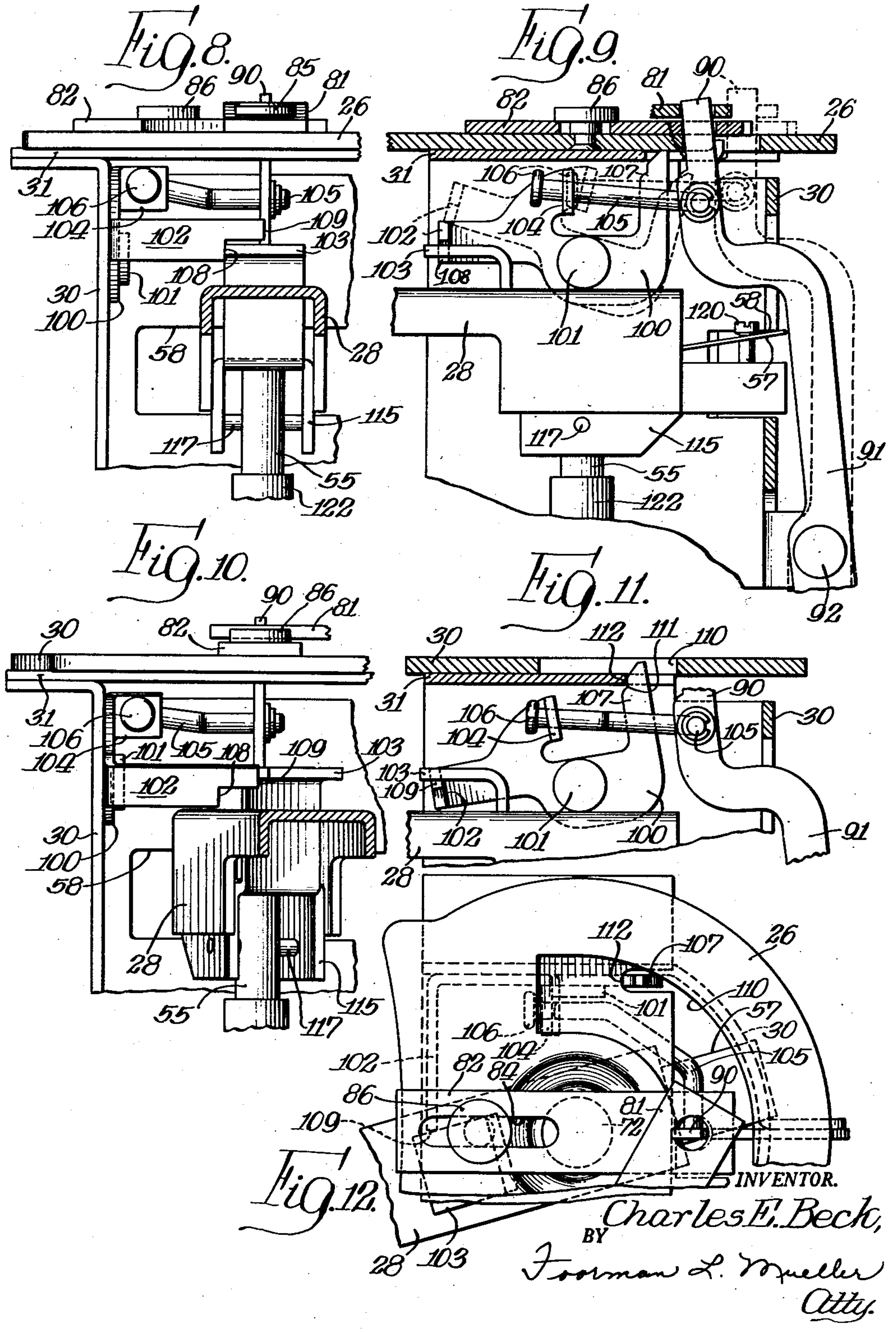
Figs. 8 and 9 are front and side views of the support post with the shelf thereon adjusted for small size records.
Figs. 10 and 11 are front and side views of the support post with the shelf adjusted for larger records.
Fig. 12 is a top view illustrating the mechanism in position for playing large records.

As previously stated, a stop mechanism is provided for limiting the movement of the tone arm so that the tone arm is properly positioned on the edge of records of the size being played. This is accomplished through the crank arm 100 which is pivotally mounted at 101 to the side of the upper frame 30, as clearly shown in Figs. 3 to 12. The crank arm includes a stepped projection 102 which may be positioned to be engaged by the finger 103 extending above the tone arm 28 to thereby restrain movement of the tone arm. The crank arm includes a second projection 104 having an opening therein through which bent pin 105 extends. As best shown in Figs. 3 and 12, the bent pin is secured to the trip arm 91 and has a head 106 thereon for engaging the projection 104 on the crank arm 100 for rotating the crank arm in a clockwise direction when the upper end of the trip arm 91 is moved backward. This position is shown by the dotted lines in Fig. 9. The crank arm 100 has a third projection 107 which is adapted to engage the record support shelf 26.

Figs. 5, 8 and 9 show the record support shelf in position to support ten inch records. The projection 107 of the crank arm 100 engages the shelf 26 and holds the projection 102 of the crank arm in position so that the finger 103 on the tone arm engages the step 108 which allows the tone arm to swing to the right of the position to engage the edge of a ten inch record. As previously stated, the main slide 35 moves back and then forward in the record changing cycle. When the slide has moved to its most forward position, the back end of the slot 95 therein engages the end 94 of the trip arm 91 so that the top end 90 of the arm is moved back as shown in the dotted position (Fig. 9). The bent pin 105 is therefore pulled back so that the head 106 thereon engages the projection 104 on the crank arm 100 and raises the stepped projection 102 clear of the tone arm fingers 103. This allows the tone arm to move across the record following the groove therein in the normal way.

In Figs. 10, 11 and 12, the support post mechanism is illustrated with the shelf positioned to receive twelve inch records. In this position the projection 107 on the crank arm is not restrained by the shelf 26 but extends through a slot 110 therein, which also serves to clear the top end 90 of the trip arm 91 as the shelf is moved to the two positions. The projection 107, however, has a shoulder 111 which engages the edge 112 of the top plate 31 to limit the movement of the crank arm 100. This causes the stepped projection 102 on the crank arm to move to a position so that the finger 103 on the tone arm engages step 109. This does not allow the tone arm to come in as far so that the arm is positioned for engagement with a larger record, being arranged to engage a twelve inch record in the structure illustrated. At the end of the changing cycle, the top end 90 of the trip arm will again be pushed back and will operate through the bent pin 105, the head 106 of which engages the projection 104, to rotate the crank arm 100 clockwise so that the stepped projection 102 is out of the way and the tone arm can follow the groove across the record.

Considering now the operation of the record changer, and assuming that a record is being played and a plurality of records are supported on the center spindle 23 and the support post 27, when the tone arm 28 is drawn toward the center post 23 by the continuation of the record groove, the movement of the tone arm is transmitted through spindle 55 to the disc 61, and the projection 65 thereon engages the projection 66 on the arm 50 to withdraw the shelf 47 from under the projection 45 of the dog 38. The weight 48 causes the projection 45 to drop down so that the projection 44 on the dog 38 engages the pin 40 secured to the turntable 22. This provides a driving engagement between the turntable and the gear 37 which is transmitted through the gear 36 and causes the slide 35 to start its reciprocating movement. Movement of the slide 35 causes the spindle 55 to move up on the incline 54 and the tone arm 28 to be raised above the record. Continued movement of the slide 35 results in engagement between the fingers 62 and the disc 61 to rotate the spindle 55 so that the tone arm 28 is moved out to a position clear of the records. As the slide 35 moves back the portion 67 on the arm 50 engages pin 68 to reset the shelf 46 with respect to slide 35. As the slide 35 reaches the end of its backward travel, it causes the trip arm 91 to turn in a counterclockwise direction so that the push-off finger which is in operative position pushes off the bottom record of the records supported above the turntable so that this record drops down upon the turntable.

The slide 35 then starts moving in and the fingers 62 thereon, through engagement with the disc 61, will cause the tone arm 28 to swing in toward the record. This movement is stopped when the finger 103 on the tone arm engages the projection 102 on the crank arm to prevent further inward rotation of the tone arm. The slide 35 continues moving inward with the spindle 55 riding down the incline 54 to allow the tone arm 28 to engage the edge of the record to be played. As the slide returns to the normal position the trip arm 91 is rotated clockwise to rotate the crank arm 100 so that the projection 102 moves clear of the finger 103 and the tone arm 28 is free to proceed across the record. As the slide 35 moves all the way in, the inclined end 47 of the shelf 46 is in position so that the projection 45 of the dog 38 rides up on the shelf, with the portion 44 of the dog being disengaged from the pin 40 on the turntable and the record changer mechanism being rendered inoperative.

As previously stated, the record supporting shelf 26 on the support post 27 is adjustable to two positions for handling records of different diameters and automatically causes movement of the crank arm 100 to position the stop thereon for limiting the movement of the tone arm to the desired positions for playing records of the two diameters. It is therefore necessary only to adjust the shelf on the supporting post for the size of record to be played and the stop mechanism will automatically position itself for a record of the desired size.

It is seen from the above that the record changer mechanism is all operated through the slide which cooperates with the tone arm spindle to raise and rotate the tone arm and for tripping the mechanism in accordance with the position of the tone arm. The slide also operates through the trip arm to push off the records individually and to operate the stop mechanism so that it controls the position of the tone arm and is out of the way while a record is being played. Connection of the mechanism to the turntable, for driving the mechanism therefrom, is provided through a single disengageable link or dog. This results in a very simple changer mechanism formed of components which are not critical and are of very inexpensive construction. The mechanism is quiet in operation and operates relatively rapidly.

Although one embodiment of the invention has been described which is illustrative thereof, it is obvious that various changes and modifications can be made therein within the intended scope of the invention as defined in the appended claims.

I claim:

1. Automatic record playing and changing apparatus comprising in combination, a turntable for supporting a record being played, a tone arm for engagement with a record on said turntable, a rotatable shaft supporting said tone arm and having a projecting portion thereon, support means for holding a plurality of records above said turntable, said support means including a shelf, first and second push-off fingers on said shelf, and stop means, said shelf being adjustable between first and second positions for holding records of first and second sizes respectively, said first and second push-off fingers being positioned to be individually operable when said shelf is in said first and second positions respectively, and stop means being movable in response to adjustment of said shelf to said first and second positions to positions for limiting movement of said tone arm so that said tone arm is positioned for records of said first and second sizes respectively, a slide mechanism mounted for reciprocating movement and including an inclined portion and a friction portion, coupling means connected to said slide mechanism and selectively operable to connect said slide mechanism to said turntable to cause movement of said slide mechanism in a reciprocating manner, said shaft having an end resting on said slide mechanism and being raised by said inclined portion thereof when said slide mechanism is moved, said friction portion of said slide mechanism being in fixed position thereon and engaging said projecting portion of said shaft for rotating said tone arm away from said turntable as said slide mechanism moves in a first direction and for rotating said tone arm toward said turntable as said slide mechanism returns, with said tone arm being stopped by said stop means, and a pivoted lever arm interconnecting said slide mechanism and said push-off fingers for moving said fingers for dropping a record in response to movement of said slide mechanism.

2. In automatic record playing and changing apparatus including a turntable for supporting a record, a spindle supported at the center of said turntable, a tone arm supported for engagement with the record on said turntable, and means including said spindle for supporting a plurality of records above said turntable and for individually dropping said records on said turntable; automatic means for operating said apparatus including in combination, slide means mounted for reciprocating movement, said slide means including portions connected to said tone arm and to said supporting means and causing operation thereof to provide a record changing cycle in response to a reciprocal movement of the slide means, and means for providing reciprocal movement of said slide means including a driving gear positioned below the turntable and coaxial therewith, a tiltable link mechanically connected to said gear and having a projection thereon adapted to engage a portion of the turntable, trip means on said slide means operating when set to tilt said link to a position in which said projection thereof is out of engagement with the turntable, and means operatively connected to the tone arm for releasing said trip means in response to movement of the tone arm to the center of a record after the record has been played, so that said link moves to a position in which said projection engages said turntable for driving said gear from said turntable and said slide means is driven thereby through a reciprocal movemnet, said trip means including means for resetting the same in response to reciprocal movement of said slide means so that said link is tilted thereby and the driving connection to said gear is removed after one reciprocal movement of said slide means.

References Cited in the file of this patent

UNITED STATES PATENTS

| | | |
|---|---|---|
| 2,192,757 | Routin | Mar. 5, 1940 |
| 2,328,052 | Butler | Aug. 31, 1943 |
| 2,331,383 | Faulkner | Oct. 12, 1943 |
| 2,339,981 | Cranmer et al. | Jan. 25, 1944 |
| 2,374,080 | Dale | Apr. 17, 1945 |
| 2,394,539 | Erwood et al. | Feb. 12, 1946 |
| 2,395,026 | Weaver | Feb. 19, 1946 |
| 2,396,094 | Gay | Mar. 5, 1946 |
| 2,453,123 | Erwood | Nov. 9, 1948 |
| 2,488,260 | Ascoli | Nov. 15, 1949 |
| 2,509,811 | Dale | May 30, 1950 |
| 2,536,432 | Faulkner | Jan. 2, 1951 |
| 2,561,792 | Emde | July 24, 1951 |